United States Patent
Tang et al.

(10) Patent No.: US 10,817,758 B2
(45) Date of Patent: Oct. 27, 2020

(54) FRAMEWORK FOR INTEGRATING DEFORMABLE MODELING WITH 3D DEEP NEURAL NETWORK SEGMENTATION

(71) Applicant: INTERNATIONAL BUSINESS MACHINES CORPORATION, Armonk, NY (US)

(72) Inventors: Hui Tang, San Jose, CA (US); Mehdi Moradi, San Jose, CA (US); Chun Lok Wong, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 203 days.

(21) Appl. No.: 16/013,621

(22) Filed: Jun. 20, 2018

(65) Prior Publication Data
US 2019/0392267 A1    Dec. 26, 2019

(51) Int. Cl.
*G06K 9/66*    (2006.01)
*G06T 7/11*    (2017.01)

(52) U.S. Cl.
CPC .................. *G06K 9/66* (2013.01); *G06T 7/11* (2017.01); *G06T 2207/10081* (2013.01); *G06T 2207/20081* (2013.01); *G06T 2207/20084* (2013.01); *G06T 2207/30048* (2013.01)

(58) Field of Classification Search
CPC .................................... G06K 9/66; G06T 7/11
See application file for complete search history.

(56) References Cited

U.S. PATENT DOCUMENTS 9,760,807 B2    9/2017  Zhou et al.
9,792,531 B2    10/2017 Georgescu et al.
(Continued)

OTHER PUBLICATIONS

Liu, F. et al. "Deep Convolutional Neural Network and 3D Deformable Approach for Tissue Segmentation in Musculoskeletal Magnetic Resonance Imaging." (2017).
(Continued)

*Primary Examiner* — Leon Flores
(74) *Attorney, Agent, or Firm* — Erik Huestis; Stephen Kenny; Foley Hoag LLP

(57) ABSTRACT

Methods for image segmentation and smoothing of image segmentations are provided. In various embodiments, a plurality of training images is provided to a segmentation network. A candidate segmentation is obtained from the segmentation network for each of the plurality of training images. Each candidate segmentation is compared to a ground truth segmentation to compute a loss metric for each candidate segmentation. Based on the gradient of the loss, the segmentation network is trained to minimize level set smoothing energy. In various embodiments, an input image is downsampled from a first resolution to a second, lower resolution. The downsampled image is provided to a segmentation network. A segmentation at the second resolution is obtained from the segmentation network. The segmentation from the second resolution is upsampled to the first resolution. The input image and the upsampled segmentation are provided at the first resolution to a convolutional network. An updated segmentation at the first resolution is obtained therefrom.

13 Claims, 13 Drawing Sheets

(56) References Cited

U.S. PATENT DOCUMENTS 9,792,532 B2 10/2017 Cox et al.
2018/0260957 A1* 9/2018 Yang .................... G06T 7/0012

OTHER PUBLICATIONS

Novikov, AA. et al. "Fully Convolutional Architectures for Multi-Class Segmentation in Chest Radiographs." 2018.
Dotz, J. et al. "3D Fully Convolutional Networks for Subcortical Segmentation in MRI: A Large-Scale Study." 2017.
Attia, A. et al. "Detection and Segmentation of the Left Ventricle in Cardiac MRI Using Deep Learning." 2018.
"Correcting Image Anomalies Using Machine Learning." Dec. 15, 2017.

* cited by examiner

FRAMEWORK FOR INTEGRATING DEFORMABLE MODELING WITH 3D DEEP NEURAL NETWORK SEGMENTATION

BACKGROUND

Embodiments of the present disclosure relate to convolutional neural networks, and more specifically, to integrating deformable modeling with 3D deep neural network segmentation.

BRIEF SUMMARY

According to embodiments of the present disclosure, methods of and computer program products for smoothing image segmentations are provided. In various embodiments, a plurality of training images is provided to a segmentation network. A candidate segmentation is obtained from the segmentation network for each of the plurality of training images. Each candidate segmentation is compared to a ground truth segmentation to compute a loss metric for each candidate segmentation. Based on the gradient of the loss, the segmentation network is trained to minimize level set smoothing energy.

According to embodiments of the present disclosure, methods of and computer program products for image segmentation are provided. In various embodiments, an input image is downsampled from a first resolution to a second, lower resolution. The downsampled image is provided to a segmentation network. A segmentation at the second resolution is obtained from the segmentation network. The segmentation from the second resolution is upsampled to the first resolution. The input image and the upsampled segmentation are provided at the first resolution to a convolutional network. An updated segmentation at the first resolution is obtained therefrom.

DETAILED DESCRIPTION

Figure 1:
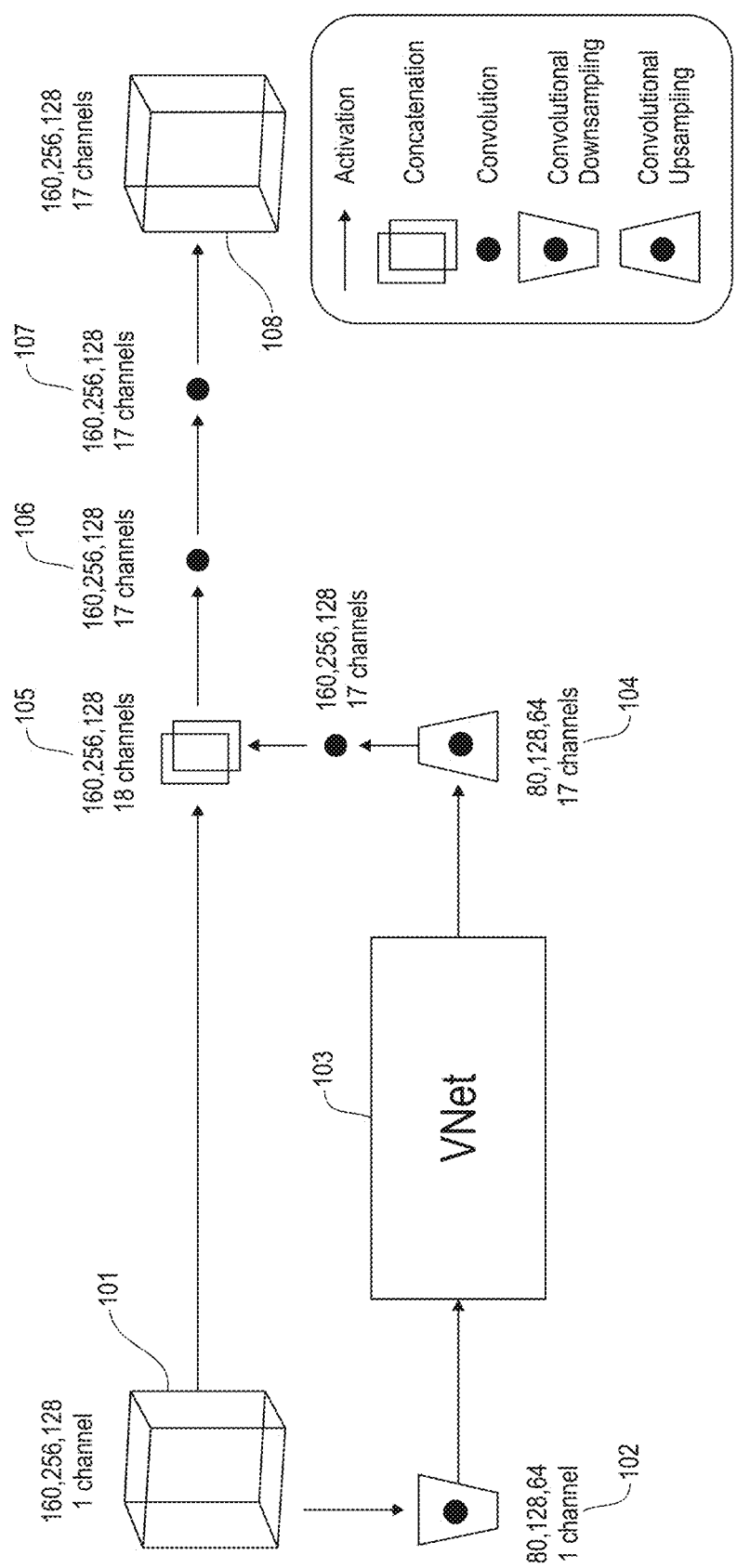
FIG. 1 depicts a network architecture according to an embodiment of the present disclosure.

Convolutional neural networks have advanced the state of the art in medical image segmentation. However, there are two challenges in 3D deep learning segmentation networks for which the current state of the art does not adequately address. First, the segmentation masks from deep learning networks lack shape constraints, often resulting in the need for post-processing. Second, the training and deployment of 3D networks require substantial memory resources. The memory requirement becomes an issue especially when the target organs cover a large footprint. Commonly down-sampling and up-sampling operations are needed before and after the network. To address the post-processing requirement, a new loss function is presented herein that incorporates the level set based smoothing loss together with multi Dice loss to avoid an additional post processing step. The formulation is general and can accommodate other deformable shape models. Further, a technique to integrate the down- and up-sampling in the network is provided such that the input of the deep learning network can work directly on the original image without a significant increase in the memory usage. In the exemplary embodiment disclosed herein, the 3D segmentation network with the proposed loss and sampling approach exhibits favorable results on a dataset of 48 chest CT angiography images with 16 target anatomies. In an exemplary disclosed herein, an average Dice of 79.5% in 4 fold cross validation is presented. This technique is advantageous in that it requires less time (e.g. only milliseconds), does not require post processing, and provides results which match the state of the art in multi atlas label fusion.

Advances in deep learning segmentation methods have enabled faster 2D and 3D segmentation. In these networks, compared to traditional methods, high-level deeply learned features from a receptive field are used. Compared to stacked 2D slice segmentation, 3D segmentation has a better chance of producing consistent and continuous object shapes. However, learning a 3D volume neural network segmentation faces two challenges.

First, each voxel is classified using content from a receptive field with certain size but the overall shape of the object is not taken into account. Therefore, a post processing step to further refine the segmentation is usually needed. To address this problem, fully connected conditional random fields (CRF) have been used to refine brain lesion segmentation in a post processing step. Additionally, a graph cut in the post processing has been employed. Level set is also often used as a post processing step to refine the segmentation output from deep learning networks. In the deployment stage, the deep learning step takes milliseconds while the post processing step usually takes longer. Thus integrating the post processing step in the learning of the deep learning weights can further speed up and simplify the segmentation process in the deployment stage. Some have proposed a deep level set method for liver CT and left ventricle MRI segmentation. This technique uses level set to refine an initial segmentation from a network trained with limited data, and then backpropagate the loss between the refined segmentation and the deep learning output. However, this method does not have an explicit mathematical formulation of the integration.

Second, 3D volume segmentation requires significant memory because of the huge number of weights learned. Constrained by the memory limit, usually small volumes, either from downsampling of the original image or smaller cropped regions are fed into a deep learning network. The original image has been downsampled before feeding into the network and upsampled it back. However, this downsampling method results in lost information. Besides downsampling, batch-wise spatial dropout and Monte Carlo inference has also been used to reduce memory costs without affecting performance. Memory usage can also be reduced if fewer kernels in each layer or fewer layers are used in the network. However, reducing the number of kernels will reduce the number of learned latent features and increase the risk of getting a biased network. Reducing the number of layers will shorten the network depth and thus result in a smaller receptive field and lose part of the neighborhood information.

The present disclosure focuses on addressing the two challenges discussed above. For the first challenge, a novel way to integrate a level set energy function into Dice based loss is provided. In accordance with an aspect of the disclosure, the loss can drive the learning of the network weights such that the segmentation output of the network has the smooth property defined by a level set energy function. This smoothing energy is propagated back into the network to train a set of weights that can output a smoother segmentation. For the second challenge, the present disclosure processes large volumes by integrating downsampling and upsampling into the network to process a larger volume.

An exemplary embodiment of the present disclosure was evaluated in 48 chest CTA datasets where 16 anatomies are manually segmented. The results demonstrate the efficiency of integrating post processing into deep learning network and show Dice comparable to the state of the art multi atlas based segmentation method, while reducing the processing time for a volume to millisecond.

The present disclosure includes the framework of integrating the surface smoothing into deep learning training, followed by a modified segmentation network that handles large volumes by adding very few parameters to the network.

Integrating Level Set Energy into Network Loss Function

In an exemplary embodiment, the softmax output of a segmentation network is bounded between 0 and 1. As such, the $n_{th}$ output can be treated as a Heaviside function $H^n(x)$ of a latent surface S and its corresponding level set embedding function $\phi^n(x)$ can be obtained using signed distance transform. From a given $\phi^n(x)$, the corresponding Heaviside function is approximated as:

$$H^n(x) = \frac{1}{2}\left(1 + \frac{2}{\pi}\arctan\left(\frac{\phi^n(x)}{\epsilon}\right)\right).$$

In level set representation, smoothing a surface is equal to evolving its corresponding embedding function. Thus the level set loss used for smoothing a surface is defined as:

$$E(\phi^n(x)) = \int_\Omega \delta(\phi^n(x)) \times |\nabla \phi^n(x)| dx \quad \text{Equation 1}$$

where $\Omega$ is the volume inside the surface S, x is the voxel index, $\delta^n(x)$ is the gradient of $H^n(x)$ with regard to x, and is equal to:

$$\frac{\epsilon}{\pi(\epsilon^2 + \phi^n(x)^2)}.$$

Different types of loss, such as cross entropy loss, Dice based loss for binary segmentation, or probabilistic Dice scores can serve as candidates to train a segmentation network. The present disclosure utilizes multi Dice, which is the sum of Dice for different organs as an example to integrate with level set based surface energy.

Using H(x) to denote the group of $H^n(x)$ for all anatomies, the overall loss to minimize can be written as:

$$E(H(x)) = E_1(H(x)) + E_2(H(x)) = -\sum_{n=0}^{N} \text{Dice}(H^n(x), g^n(x)) + \quad \text{Equation 2}$$

-continued $$\sum_{n=0}^{N} w_n \times \int_\Omega \delta(\phi^n(x)) \times |\nabla \phi^n(x)| dx$$

where $E_1$ is the multi Dice based loss and $E_2$ is the level set based loss. The level set based loss is defined to be the overall area of the segmentation surface for the $n_{th}$ anatomy, $g^n(x)$ is the ground truth binary mask of the $n_{th}$ anatomy, $w_n$ is the weight used for different anatomies, and N is the number of anatomies.

For back propagation, the gradient of the loss with respect to the network prediction $H^n(x)$ is computed:

$$\frac{\partial E(H(x))}{\partial H^n(x)} = \frac{\partial E_1(H(x))}{\partial H^n(x)} + w_n \times \frac{\partial E_2(H(x))}{\partial H^n(x)} \quad \text{Equation 3}$$

in which the first part can be calculated as:

$$\frac{\partial E_1(H(x))}{\partial H^n(x)} = 2\left(\frac{g_j^n(x)\left(\sum_i^I H_i^n(x)^2 + \sum_i^I g_i^n(x)^2\right) - 2H_j^n(x)\sum_i H_i^n(x)g_i^n(x)}{\left(\sum_i^I H_i^n(x)^2 + \sum_i^I g_i^n(x)^2\right)^2}\right) \quad \text{Equation 4}$$

where i and j are voxel indices. The second term can be calculated as:

$$\frac{\partial E_2(H(x))}{\partial H^n(x)} = \frac{\partial E_2(H(x))}{\partial \phi^n(x)} \times \frac{\partial \phi^n(x)}{\partial H^n(x)} \quad \text{Equation 5}$$

Where:

$$\frac{\partial \phi^n(x)}{\partial H^n(x)}$$

is difficult to be solved analytically, so it can be approximated as:

$$\frac{\Delta \phi^n(x)}{H^n(\phi^n(x) + \Delta \phi^n(x)) - H^n(\phi^n(x))}$$

The gradient of $E_2(H(x))$ with respect to $\phi^n(x)$ is given as:

$$\frac{\partial E_2(H(x))}{\partial \phi^n(x)} = \delta\left(\phi^n(x) \times div\left(\frac{\nabla \phi^n(x)}{|\nabla \phi^n(x)|}\right)\right) \quad \text{Equation 6}$$

Here, the parameter:

$$div\left(\frac{\nabla \phi^n(x)}{|\nabla \phi^n(x)|}\right)$$

is the mean curvature of a surface. Equation 6 presented above evolves $\phi^n(x)$ by the surface curvature in the direction of the surface norm, which will result in a smoother surface.

The sign of the curvature determines whether a point on the surface should move inward or forward in the direction of surface normal.

Segmentation Network Architecture

Learning a 3D volume segmentation requires substantial memory and usually a downsampling of the raw image is needed before feeding into the segmentation network. An upsampling of the segmentation mask is then needed in the post processing. Since in the upsampling step, only the low resolution segmentation from deep learning rather than high resolution raw image information is used, this can result in incorrect segmentation in upsampled high resolution segmentation maps.

In accordance with an aspect of the disclosure, the architecture in FIG. 1 is provided to use the raw image to guide the upsampling of the low resolution segmentation maps. In this exemplary embodiment, the network architecture modifies VNet to integrate downsampling and upsampling procedures with additional layers having very small number of parameters. Although various embodiments of the present disclosure refer to VNet, a fully convolutional neural networks for volumetric medical image segmentation, it will be appreciated that a variety of segmentation networks may be applied according to the present disclosure. Similarly, the present disclosure may be applied to alternative segmentation methods, such as various amplitude segmentation, edge-based segmentation, region-based segmentation, texture feature based segmentation, or gray level feature segmentation methods known in the art.

The raw image 101 is first downsampled with one kernel downsampling convolution 102 (in some embodiments this can be replaced by average pooling), and the downsampled image is fed to VNet 103. In an exemplary embodiment, the last softmax layer in standard VNet is replaced with PReLU layer. The raw image is then upsampled by a deconvolution layer 104 with the number of channels preserved, which is equivalent to the number of anatomies+background. The deconvolution layer can be replaced by a bilinear resampling layer and a convolution layer. The deconvolution output is then passed through another convolution layer and then concatenated 105 with the raw image in the channel dimension, followed by two convolution and activation layers 106 . . . 107. The downsampling and upsampling added only 31698 weights when the number of anatomies n equals 16 (3×3×3 for the downsampling convolution layer, (n+1)×3×3×3×2×(n+1) for the deconvolution layer and the followed convolution layer, as well as (n+2)×3×3×3×(n+1)+(n+1)×3×3×3×(n+1) for the last two convolution layers), this number can be reduced to 513 for a binary segmentation. The resulting output segmentation 108 has the same resolution as the input 101. Thus, most of the computation stays inside the VNet architecture whose input size is half the original input size in each dimension. This allows the processing of a large image without adding much to memory cost.

Implementation Details

This method is implemented in Caffe and runs on one TITAN X GPU with 12 GB of memory. The proposed architecture is first trained using multi Dice loss for 300 epochs until it converges. And then training is continued using the proposed loss which integrates the level set smoothing energy for 15 epochs. Since anatomies with naturally different surface curvature exist, different smoothing weights for different anatomies can also be set. For the vertebrae, the myocardium and the left ventricle, the weights are set to be $1\times10^{-5}$, while for others a weight of $1\times10^{-4}$ is employed.

Experiments and Results

In an exemplary embodiment, 48 cardiac CTA images were collected and annotated for 16 anatomical structures by one annotator. The 16 anatomies were: sternum, ascending aorta, descending aorta, aortic arch, aortic root, left pulmonary artery, right pulmonary artery, trunk pulmonary artery, vertebrae, left atrium, right atrium, left ventricle, right ventricle, left ventricular myocardium, superior vena cava, and inferior vena cava. The cardiac CT studies used were acquired by a Siemens CT scanner. All images have voxel size of 1.5 mm in all directions.

Figure 2A:
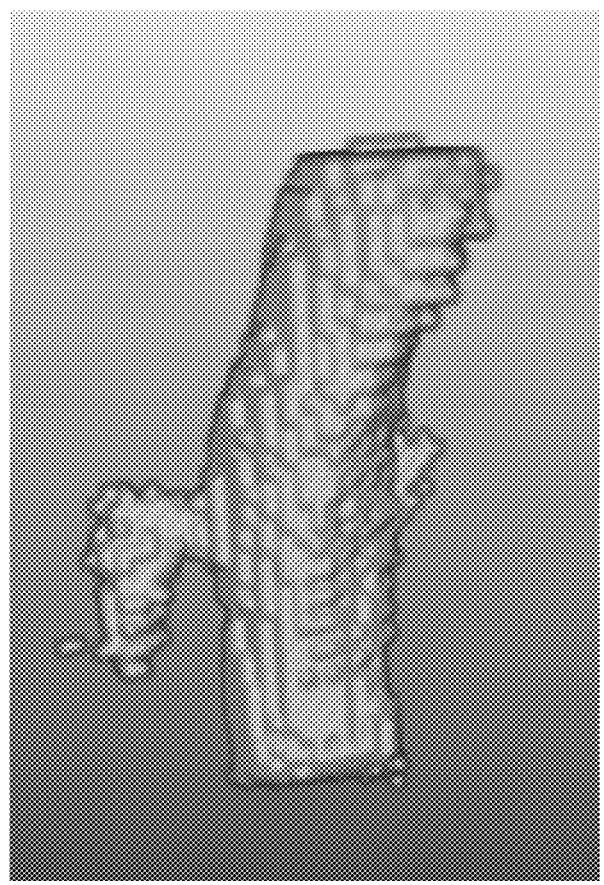
FIGS. 2A-3C depict various smoothing term effects according to an embodiment of the present disclosure.
Figure 2B:
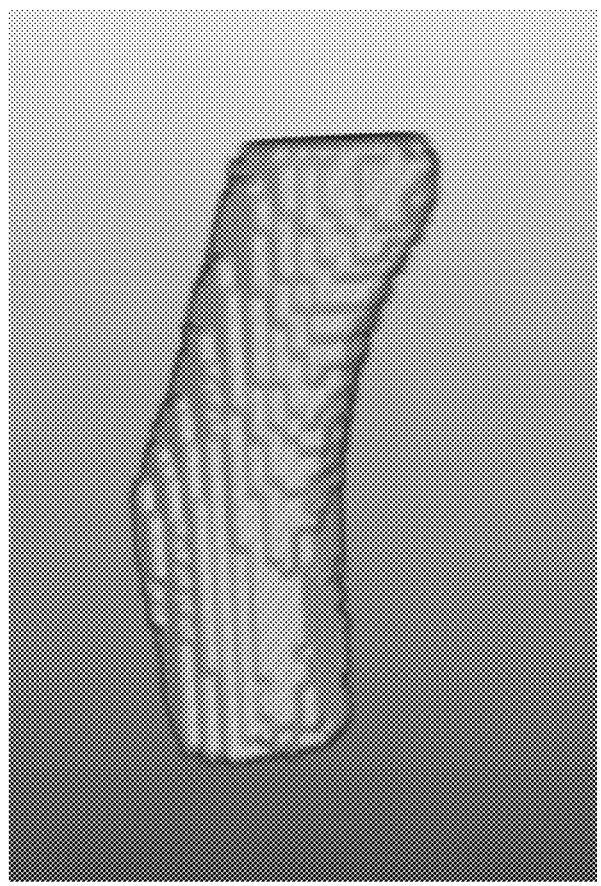
Figure 2C:
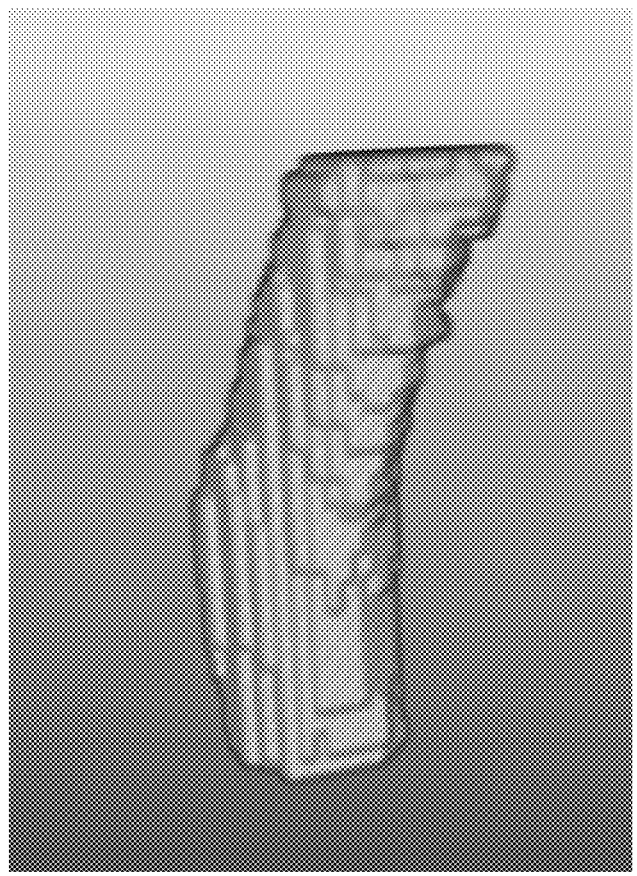

For the first stage of training which does not have the level set integrated loss, an average Dice of 79.3% for 4-fold cross validation was obtained. After continued training with level set based smoothing energy, Dice of 79.5% was obtained. The sole original manual segmentation is not smooth (FIG. 5), thus adding the smoothing term does not necessarily improve Dice coefficient. However, visual observation can detect a smoother segmentation. FIG. 2 shows two superior vena cava segmentation outputs generated from two trained models with and without level set smoothing energy. Particularly, the effect of adding level set smoothing term in the loss for smoothing surfaces is shown wherein: FIG. 2A is a depiction trained with multi Dice loss, FIG. 2B is a depiction trained with the proposed loss which integrates level set smoothing energy, and FIG. 2C is a depiction with ground truth segmentation. As shown, some false positives due to image noise and lack of shape information are removed because of their high curvature property.

Figure 3A:
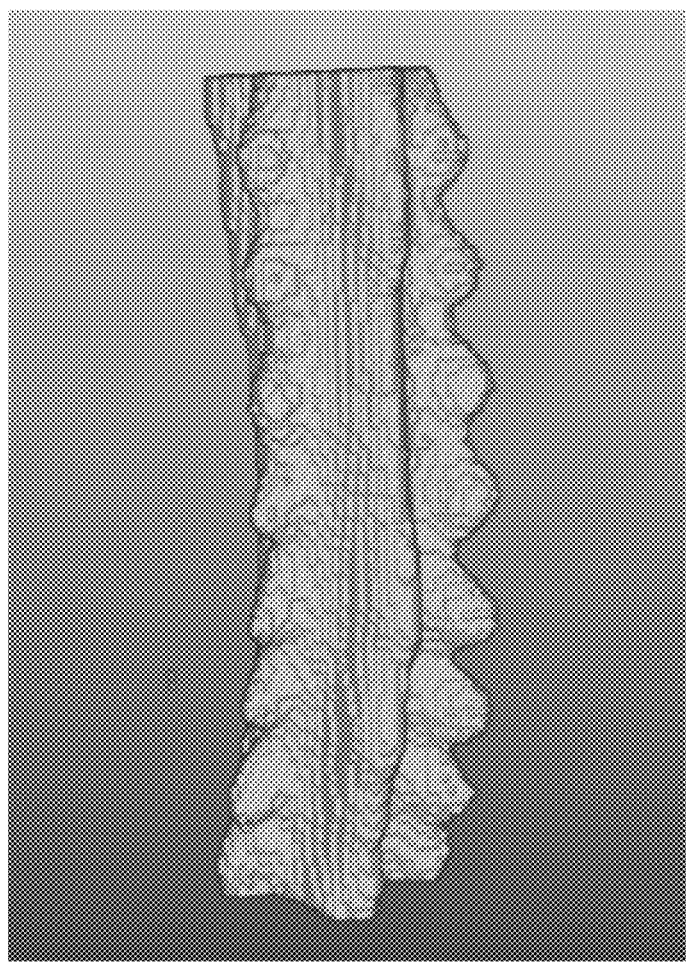
Figure 3B:
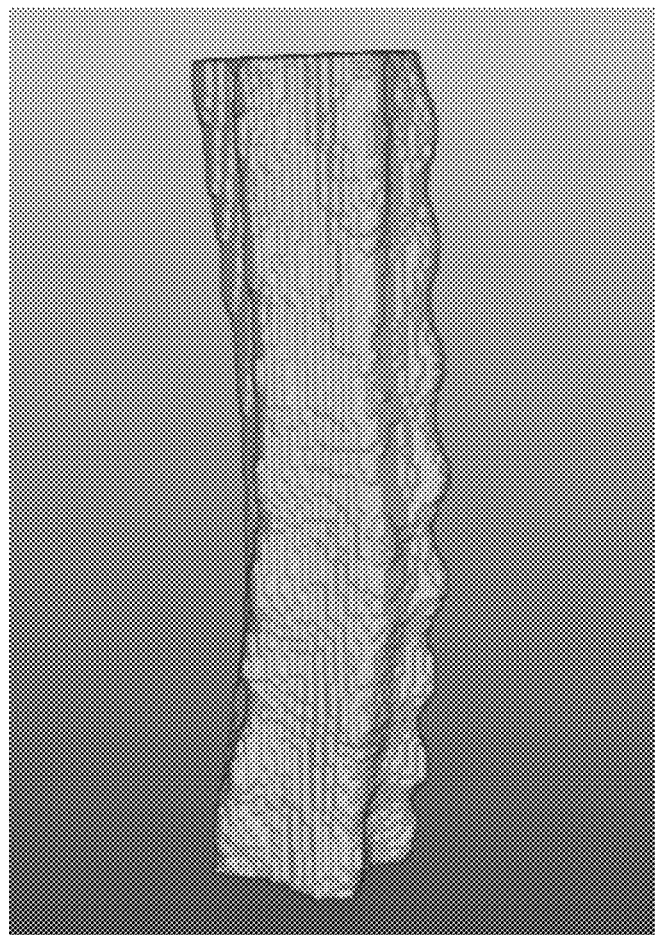
Figure 3C:
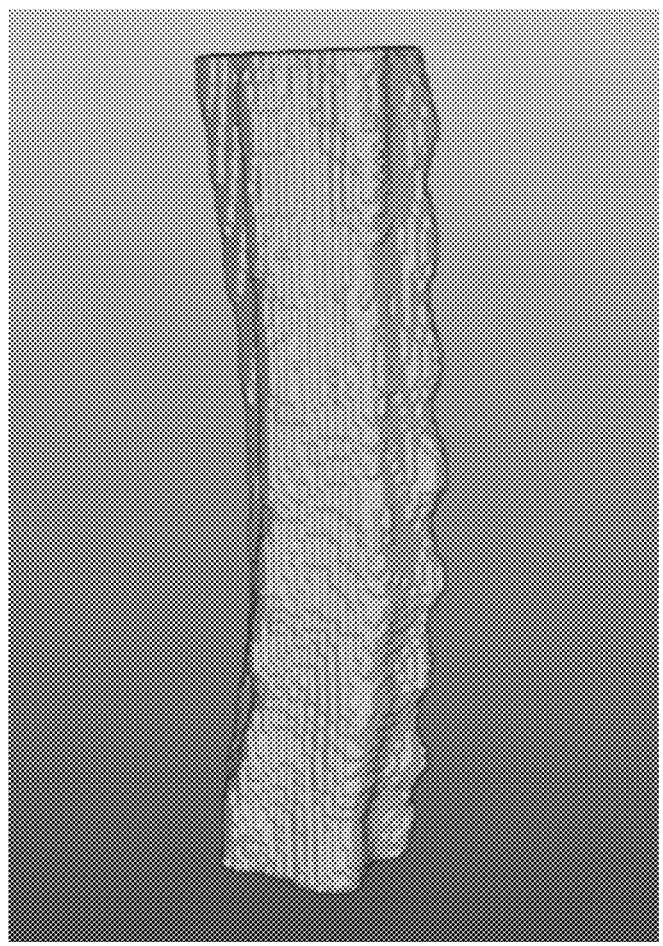

As a qualitative way of understating the effects of the new loss function on smoothing the structures, consider the case of spine as illustrated in FIG. 3. Particularly, the effect of adding level set smoothing term in the loss for smoothing surfaces is shown wherein: FIG. 3A is a depiction without smoothing, FIG. 3B is a depiction with smoothing effect after 8 epochs, FIG. 3C is a depiction with smoothing effect after 15 epochs. The progressively smooth volume after epochs 8 and 15 are visible. To better visualize the smoothing effect, a large weight (1e-4) is used in this example only for demonstration purposes only. When applying this method to other applications, the number of training epochs and the weight $w_n$ should be tuned as hyper parameters.

Performance Comparison

Figure 4:
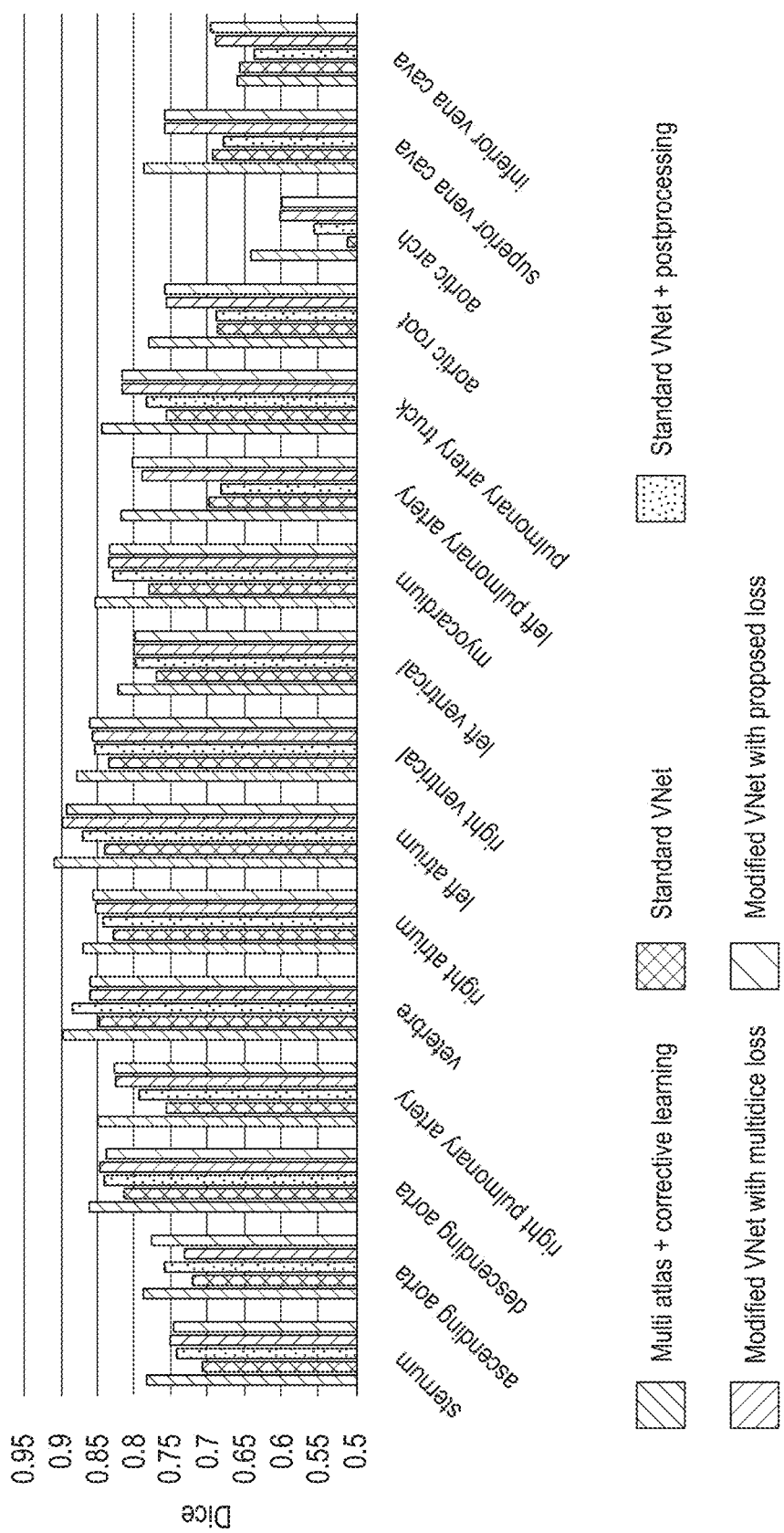
FIG. 4 depicts a performance comparison chart according to an embodiment of the present disclosure.

A comparison of the results obtained from the presently described technique with the multi atlas based segmentation method followed by corrective learning as post processing is provided in FIG. 4. As shown, the bar plot comparing Dice per anatomy for five different methods: the multi atlas based method, the standard VNet which takes resampled volumes, the standard VNet followed by a level set smoothing step as post processing, the presently disclosed modified VNet architecture trained by multi Dice loss, and the presently disclosed modified VNet architecture trained by our proposed loss. For the standard VNet, due to the memory limit, the input was downsample with voxel size of 2 mm×2 mm×3.5 mm and volume size of 128×192×64.

As shown in FIG. 4, the deep learning method is comparable to the state of the art multi atlas based segmentation. The presently disclosed modified VNet architecture trained with the proposed loss performs the best among the deep learning methods. For small anatomies such as aortic root, left pulmonary artery and superior vena cava, a larger boost in the performance is realized than that for large anatomies. A summary of the comparisons is provided in Table 1 below. Table 1 includes Method 1: multi atlas method followed by corrective learning; Method 2: standard VNet; Method 3: standard VNet+post processing; Method 4: modified VNet trained with multi dice loss; and Method 5: modified VNet trained with proposed loss which integrates the level set smoothing energy.

TABLE 1

|      | Method 1 | Method 2 | Method 3 | Method 4 | Method 5 |
|------|----------|----------|----------|----------|----------|
| Mean | 0.816    | 0.744    | 0.766    | 0.793    | 0.795    |
| Std  | 0.076    | 0.088    | 0.090    | 0.081    | 0.073    |

Figure 5A:
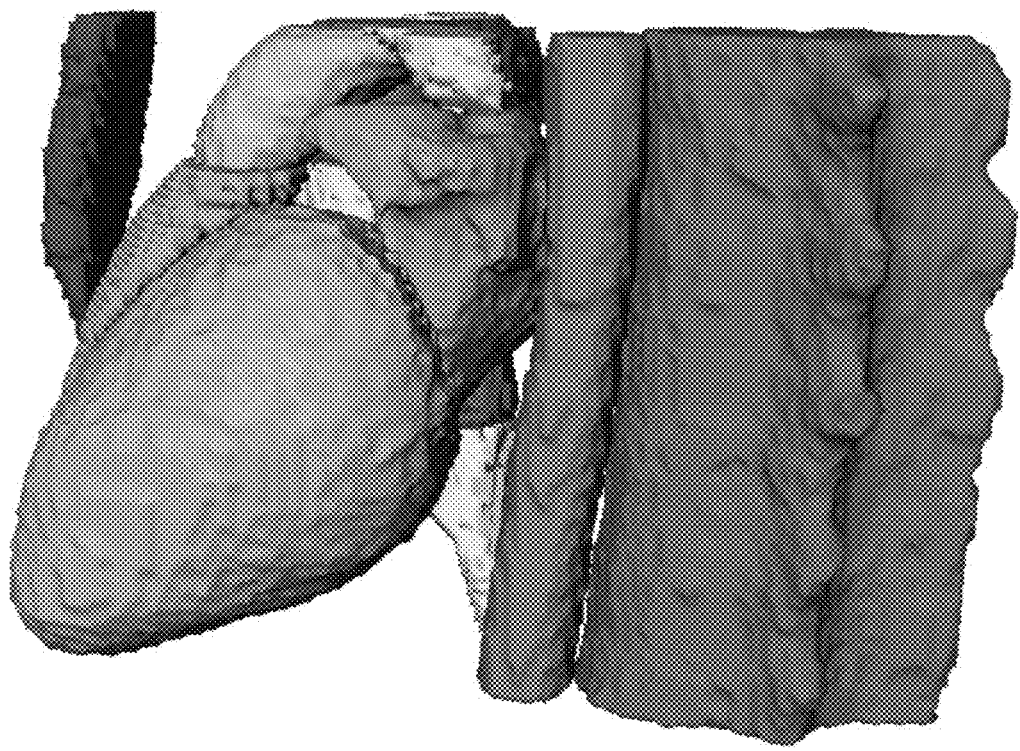
FIGS. 5A-5B depict an exemplary segmented anatomy according to an embodiment of the present disclosure.
Figure 5B:
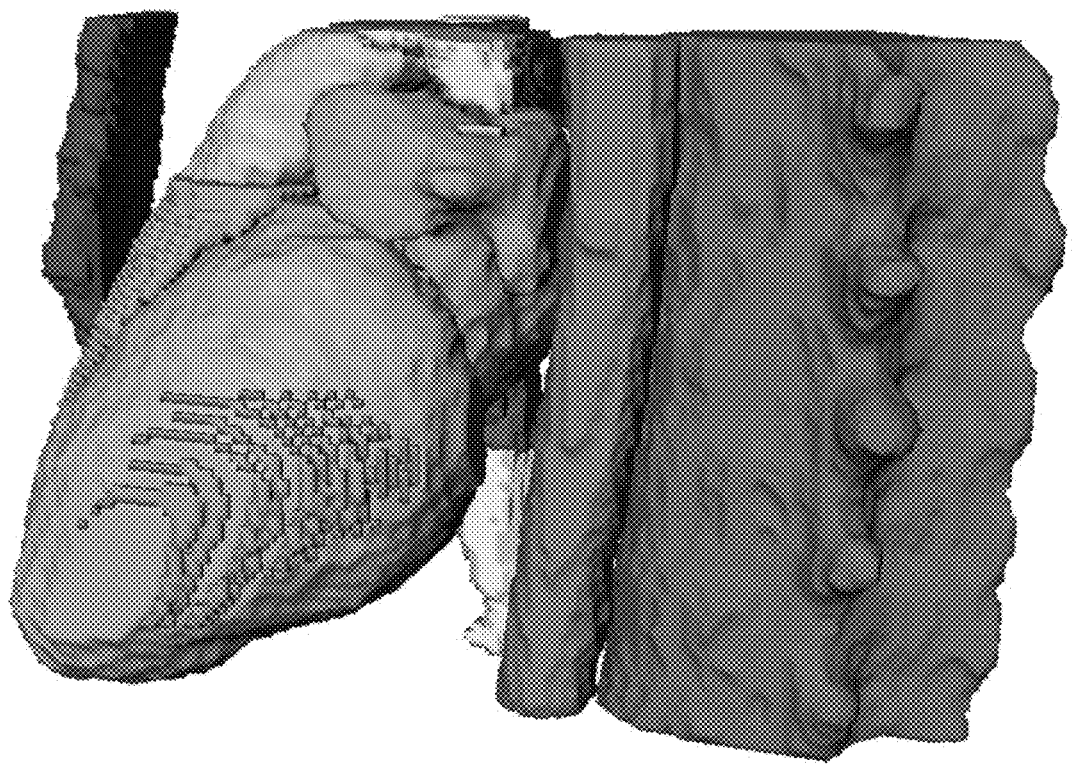

Additionally, an example of the segmented volume compared to the ground truth is shown in FIG. 5. Particularly, examples of segmented anatomies are shown with FIG. 5A depicting results from weights trained with 10 epochs using the loss disclosed herein, and FIG. 5B depicting the ground truth.

Accordingly, the present disclosure provides a new loss function to integrate the level set smoothing energy into multi Dice loss to eliminate an additional post processing step. Also provided is a new strategy for designing segmentation architectures that can process large volumes by adding very few parameters. This method is trained using four-fold cross validation and produces accurate and fast anatomic segmentation in CTA images. The disclosed framework for integrating level set with network training is general and can be extended to other types of level set energy functions.

Figure 6:
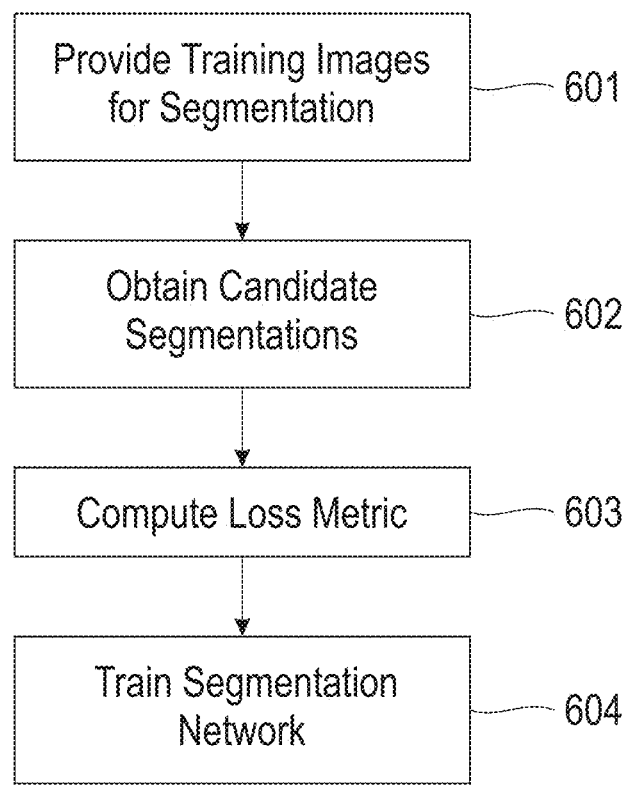
FIG. 6 illustrates a method of smoothing image segmentations according to embodiments of the present disclosure.

Referring to FIG. 6, a method of smoothing image segmentations is illustrated according to embodiments of the present disclosure. At 601, a plurality of training images is provided to a segmentation network. At 602, a candidate segmentation is obtained from the segmentation network for each of the plurality of training images. At 603, each candidate segmentation is compared to a ground truth segmentation to compute a loss metric for each candidate segmentation. At 604, based on the gradient of the loss, the segmentation network is trained to minimize level set smoothing energy.

Figure 7:
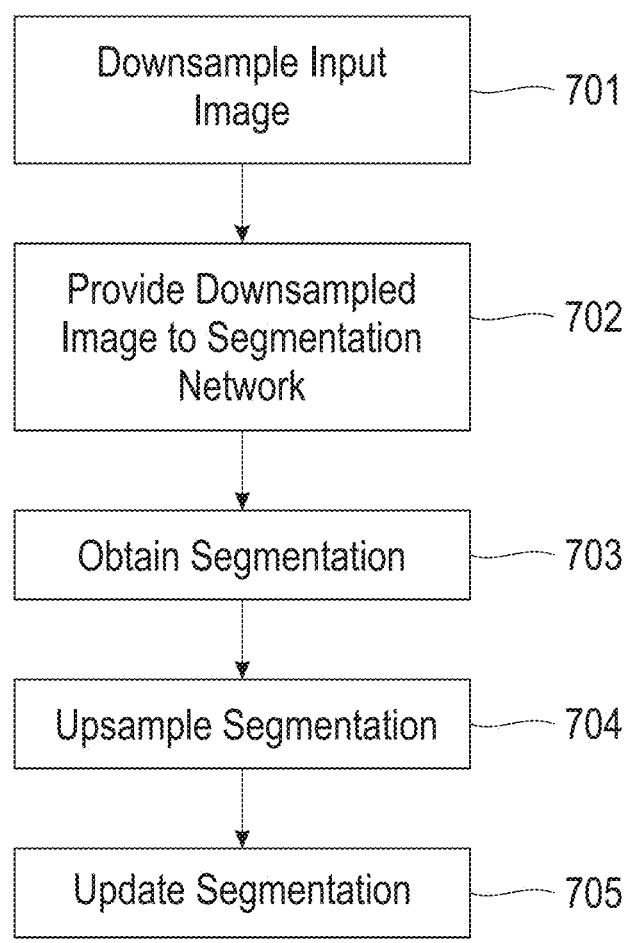
FIG. 7 illustrates a method of image segmentation according to embodiments of the present disclosure.

Referring to FIG. 7, a method of image segmentation is illustrated according to embodiments of the present disclosure. At 701, an input image is downsampled from a first resolution to a second, lower resolution. At 702, the downsampled image is provided to a segmentation network. At 703, a segmentation at the second resolution is obtained from the segmentation network. At 704, the segmentation from the second resolution is upsampled to the first resolution. At 705, the input image and the upsampled segmentation are provided at the first resolution to a convolutional network. An updated segmentation at the first resolution is obtained therefrom.

In general, Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from preceding layers and the strength of the connections as determined by the synaptic weights. An ANN is trained to solve a specific problem (e.g., pattern recognition) by adjusting the weights of the synapses such that a particular class of inputs produce a desired output.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An n error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

When applying backpropagation, an ANN rapidly attains a high accuracy on most of the examples in a training-set. The vast majority of training time is spent trying to further increase this test accuracy. During this time, a large number of the training data examples lead to little correction, since the system has already learned to recognize those examples. While in general, ANN performance tends to improve with the size of the data set, this can be explained by the fact that larger data-sets contain more borderline examples between the different classes on which the ANN is being trained.

A convolution layer exploits spatially local correlations in natural sensor data by enforcing a local connectivity pattern between neurons in adjacent layers: each neuron receives connections from only a small region of the input data tensor. The extent of this connectivity is called the receptive field of the neuron. All neurons that compute elements of the same output feature share the same set of weights and activation function parameters, called a filter, with a local receptive field. The size of a filter is fixed, irrespective of input size, so a convolution layer has far fewer free parameters than a fully connected layer with the same input and output dimensions, and a correspondingly smaller memory footprint.

For example, in a spatial convolution layer, each filter's receptive field covers only a fraction of the height and width of the input data tensor, but extends through the full feature depth. Such an architecture ensures that the filters produce the strongest response to a spatially local input pattern. The layer computes its output by convolving each filter across the width and height of the input data tensor, computing the dot product between the entries of the filter and the input data at each location to produce a 2-dimensional activation map for each filter.

Stacking the feature maps for all filters forms the full output data tensor for the convolution layer. Every element in the output data tensor can thus also be interpreted as an output of a neuron that looks at a small region in the input and shares filter parameters with neurons in the same output feature map.

Figure 8:
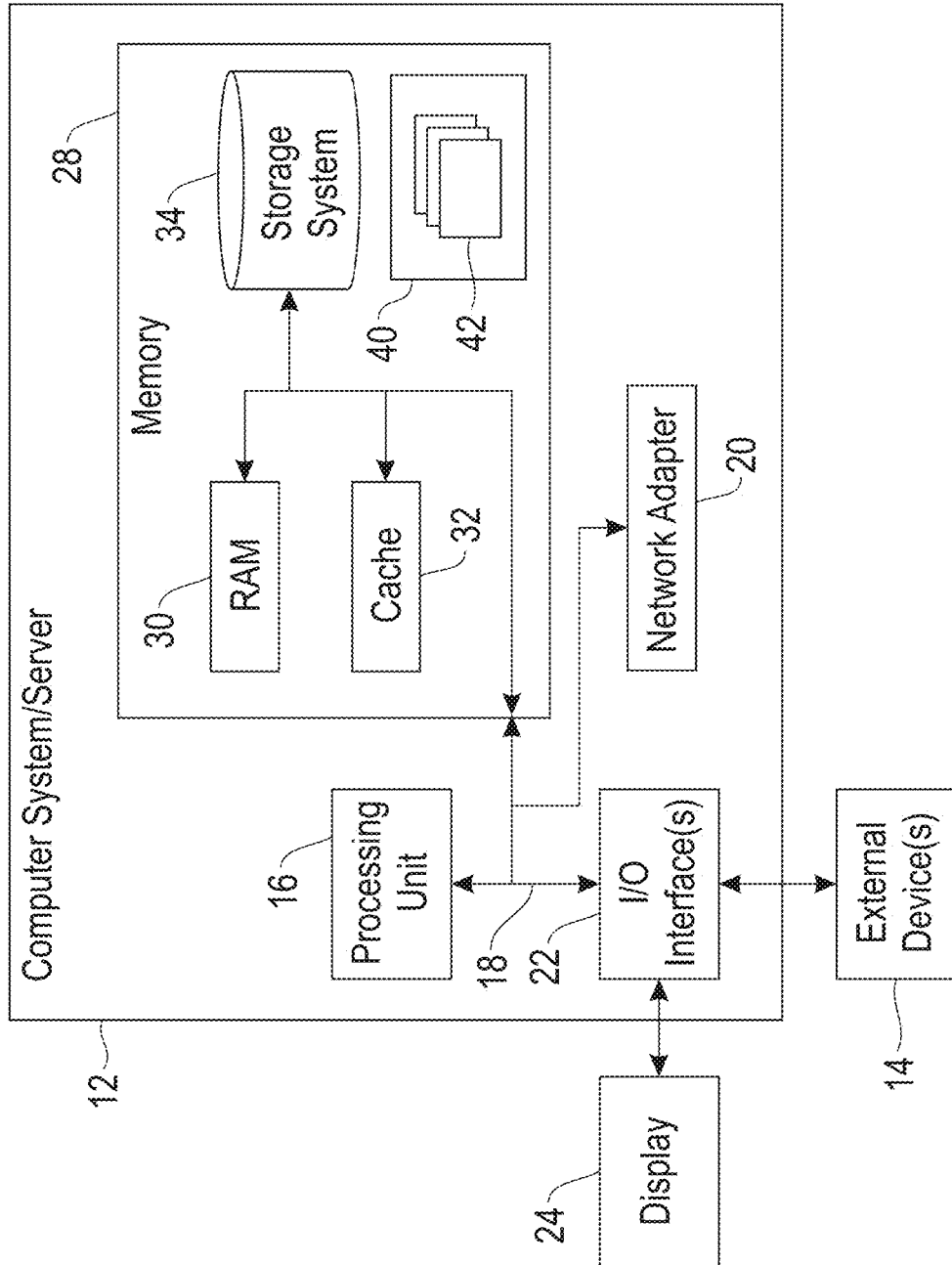
FIG. 8 depicts a computing node according to embodiments of the present disclosure.

Referring now to FIG. 8, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising: providing to a segmentation network a plurality of training images; obtaining from the segmentation network a candidate segmentation for each of the plurality of training images; comparing each candidate segmentation to a ground truth segmentation to compute a loss metric for each candidate segmentation; and based on a gradient of the loss metric, training the segmentation network to minimize level set smoothing energy, wherein the level set smoothing energy comprises an integral of a level set embedding function of a latent surface.

2. The method of claim 1, wherein the loss metric comprises cross entropy loss.

3. The method of claim 1, wherein the loss metric comprises Dice-based loss.

4. The method of claim 1, wherein the segmentation network comprises a convolutional neural network.

5. The method of claim 1, wherein the segmentation network is three-dimensional.

6. The method of claim 1, wherein the plurality of training images comprise computed tomography (CT) images.

7. The method of claim 1, wherein training the segmentation network comprises back propagation.

8. A system comprising: a datastore; a computing node comprising a computer readable storage medium having program instructions embodied therewith, the program instructions executable by a processor of the computing node to cause the processor to perform a method comprising: providing to a segmentation network a plurality of training images from the datastore; obtaining from the segmentation network a candidate segmentation for each of the plurality of training images; comparing each candidate segmentation to a ground truth segmentation to compute a loss metric for each candidate segmentation; and based on a gradient of the loss metric, training the segmentation network to minimize level set smoothing energy, wherein the level set smoothing energy comprises an integral of a level set embedding function of a latent surface.

9. The system of claim 8, wherein the loss metric comprises cross entropy loss.

10. The system of claim 8, wherein the loss metric comprises Dice-based loss.

11. The system of claim 8, wherein the segmentation network comprises a convolutional neural network.

12. The system of claim 8, wherein the segmentation network is three-dimensional.

13. The method of claim 8, wherein training the segmentation network comprises back propagation.

* * * * *